(12) United States Patent
Chen

(10) Patent No.: US 8,386,775 B2
(45) Date of Patent: Feb. 26, 2013

(54) TOLERANT KEY VERIFICATION METHOD

(75) Inventor: Hu-Mu Chen, Taipei (TW)

(73) Assignee: InterCity Business Corporation, Taipei (TW)

( * ) Notice: Subject to any disclaimer, the term of this patent is extended or adjusted under 35 U.S.C. 154(b) by 292 days.

(21) Appl. No.: 12/855,699

(22) Filed: Aug. 13, 2010

(65) Prior Publication Data

US 2011/0296170 A1 Dec. 1, 2011

(30) Foreign Application Priority Data

May 31, 2010 (TW) ................................ 99117456 A

(51) Int. Cl.
*H04L 29/06* (2006.01)
*H04K 1/00* (2006.01)
*G06F 17/00* (2006.01)

(52) U.S. Cl. ........ 713/155; 713/159; 713/183; 713/170; 726/7; 726/19; 705/17; 705/35; 705/39

(58) Field of Classification Search .................... 713/155
See application file for complete search history.

(56) References Cited

U.S. PATENT DOCUMENTS

| | | | | |
|---|---|---|---|---|
| 5,491,752 | A * | 2/1996 | Kaufman et al. | 380/30 |
| 5,872,847 | A * | 2/1999 | Boyle et al. | 713/151 |
| 6,085,168 | A * | 7/2000 | Mori et al. | 705/17 |
| 7,181,017 | B1 * | 2/2007 | Nagel et al. | 380/282 |
| 7,290,288 | B2 * | 10/2007 | Gregg et al. | 726/28 |
| 2001/0044786 | A1 * | 11/2001 | Ishibashi | 705/77 |
| 2002/0007453 | A1 * | 1/2002 | Nemovicher | 713/155 |
| 2003/0070080 | A1 * | 4/2003 | Rosen | 713/187 |
| 2003/0101344 | A1 * | 5/2003 | Wheeler et al. | 713/170 |
| 2004/0030894 | A1 * | 2/2004 | Labrou et al. | 713/168 |
| 2004/0148356 | A1 * | 7/2004 | Bishop et al. | 709/206 |
| 2005/0050327 | A1 * | 3/2005 | Okamoto | 713/170 |
| 2005/0166263 | A1 * | 7/2005 | Nanopoulos et al. | 726/7 |
| 2006/0106836 | A1 * | 5/2006 | Masugi et al. | 707/101 |
| 2006/0173794 | A1 * | 8/2006 | Sellars et al. | 705/76 |
| 2007/0083750 | A1 * | 4/2007 | Miura et al. | 713/155 |
| 2008/0077592 | A1 * | 3/2008 | Brodie et al. | 707/9 |
| 2009/0254971 | A1 * | 10/2009 | Herz et al. | 726/1 |

OTHER PUBLICATIONS

Stone-Gross, B., et al, "VeriKey: A dynamic Certificate Verification System for Public Key Exchanges", Dept. of CS, Univ. of CA, 2008, entire document, http://web.eecs.umich.edu/~rwcohn/papers/dimva08_verikey.pdf.*

* cited by examiner

*Primary Examiner* — Edan Orgad
*Assistant Examiner* — Ronald Baum
(74) *Attorney, Agent, or Firm* — CKC & Partners Co., Ltd.

(57) ABSTRACT

A tolerant key verification method is provided. The tolerant key verification method comprises the following steps. A first key is generated instantly according to first characteristic values from a user terminal and is transmitted to a verification server to perform a comparison. When a data in the verification server matches the first key, the verification server makes no response and asks a network-service server to provide a network service to the user terminal. When the data doesn't match the first key, the verification server makes no response. When no data is available, the verification server makes no response and asks a message server to send a key-regeneration signal to the user terminal such that the user terminal generates a second key instantly according to second characteristic values. The verification server saves the second key and asks the network-service server to provide the network service to the user terminal.

12 Claims, 2 Drawing Sheets

TOLERANT KEY VERIFICATION METHOD

RELATED APPLICATIONS

This application claims priority to Taiwan application no. 99117456, filed May 31, 2010, the entirety of which is incorporated herein by reference.

BACKGROUND

1. Technical Field

The present invention relates to electronic data verification method. More particularly, the present invention relates to tolerant key verification method.

2. Description of Related Art

Internet's technologies have developed rapidly in recent years. A novel industry is emerging to provide the internet-based services such as trading or multimedia. In order to protect the users of these services, the service provider has to establish a verification mechanism such that only the real users are allowed to access the service. The verification mechanism further prevents the intrusion of the hacker or the loss of the user's personal information.

Key verification mechanism is widely adopted in the conventional technology. For example, the service provider provides each user a key generation hardware that is able to generate a key through the computational method with high complexity. Only the owner of the key generation hardware can generate the key to pass the verification process. However, the development of the computational method with high complexity is time-consuming and cost-consuming. Further, no matter how complex the computational method is, the can still be cracked. Thus, if the conventional method to develop the computational method with high complexity is used, the service provider may not be able to afford the cost.

Accordingly, what is needed is a tolerant key verification method that is able to lower the cost and to be implemented by a computational method with lower complexity as well. The present disclosure addresses such a need.

SUMMARY

An aspect of the present disclosure is to provide a tolerant key verification method. The tolerant key verification method comprises the steps as follows. A first key is generated instantly according to a plurality of first characteristic values from a user terminal. The first key is transmitted to a verification server. The first key is compared with a data stored in the verification server. When the data in the verification server matches the first key, the verification server makes no response and asks a network-service server to provide a network service to the user terminal. When the data doesn't match the first key, the verification server makes no response. When the data is not available, the verification server makes no response and asks a message server to send a key-regeneration signal to the user terminal such that the user terminal generates a second key instantly according to a plurality of second characteristic values and transmits the second key to the verification server so that the verification server saves the second key and asks the network-service server to provide the network service to the user terminal, wherein the message server and the verification server are whether the same server or two different servers.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
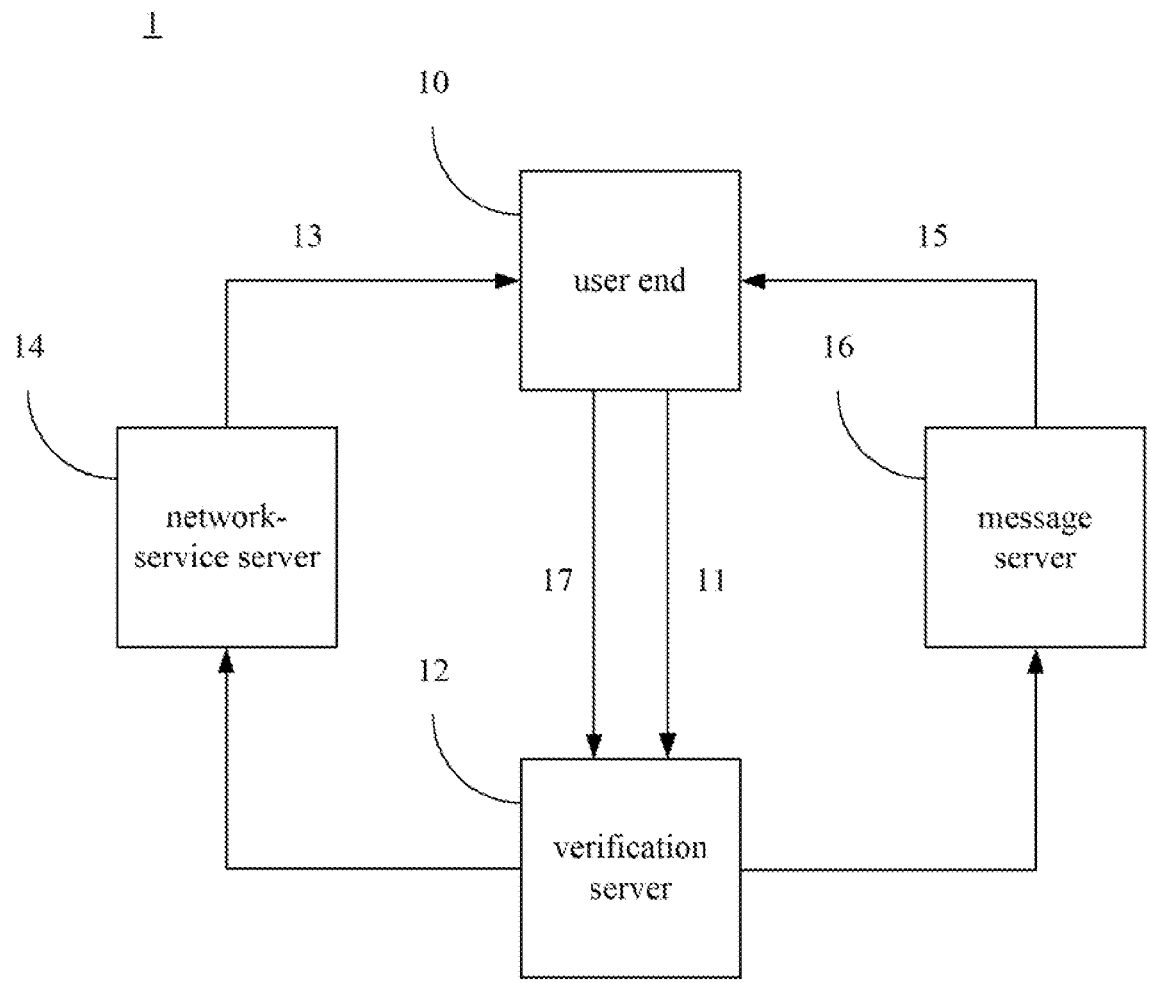
FIG. 1 is a network system of an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Please refer to FIG. 1. FIG. 1 is a network system 1 of an embodiment of the present disclosure. The network system 1 comprises a user terminal 10, a verification server 12, a network-service server 14 and a message server 16.

The verification server 12 comprises a plurality of data (not shown) each corresponding to a user such that when the user terminal 10 provides verification data, the verification server 12 is able to check if the verification data matches the data stored in the verification server 12. If the verification data matches the data stored, the verification server 12 makes the user terminal pass the verification process and asks the network-service server 14 to provide the network service to the user terminal 10. In the present embodiment, the network service can be a network TV service to provide a media stream, a network radio station service to provide online radio, an e-book or electronic text database or an internet news database to provide online news.

In order to protect the user of the services, the service provider has to establish a verification mechanism such that only the real users are allowed to access the service. The verification mechanism further prevents the intrusion of the hacker or the loss of the user's personal information. Key verification mechanism is widely adopted in the conventional technology. For example, the service provider provides each of the users a key generation hardware that is able to generate a key through the computational method with high complexity. Only the owner of the key generation hardware can generate the key to pass the verification process. However, the development of the computational method with high complexity is time-consuming and cost-consuming. Further, no matter how complex the computational method is, the key can still be cracked. Thus, if the conventional method to develop the computational method with high complexity is used, the service provider may not be able to afford the cost. For the service provider providing the services such as online radio, an e-book or electronic text database or an internet news database to provide online news, if the user's verification data is lost during a short period of time, the loss of the service provider is merely that the illegal user watch the movies or listen to the music for free during the period of the time that the verification data is lost. Therefore, it will be beneficial for the service provider providing the services described above if there is a key verification method that is able to be implemented by a computational method with low cost and low complexity and is able to provide the verification mechanism with high efficiency at the same time.

Figure 2:
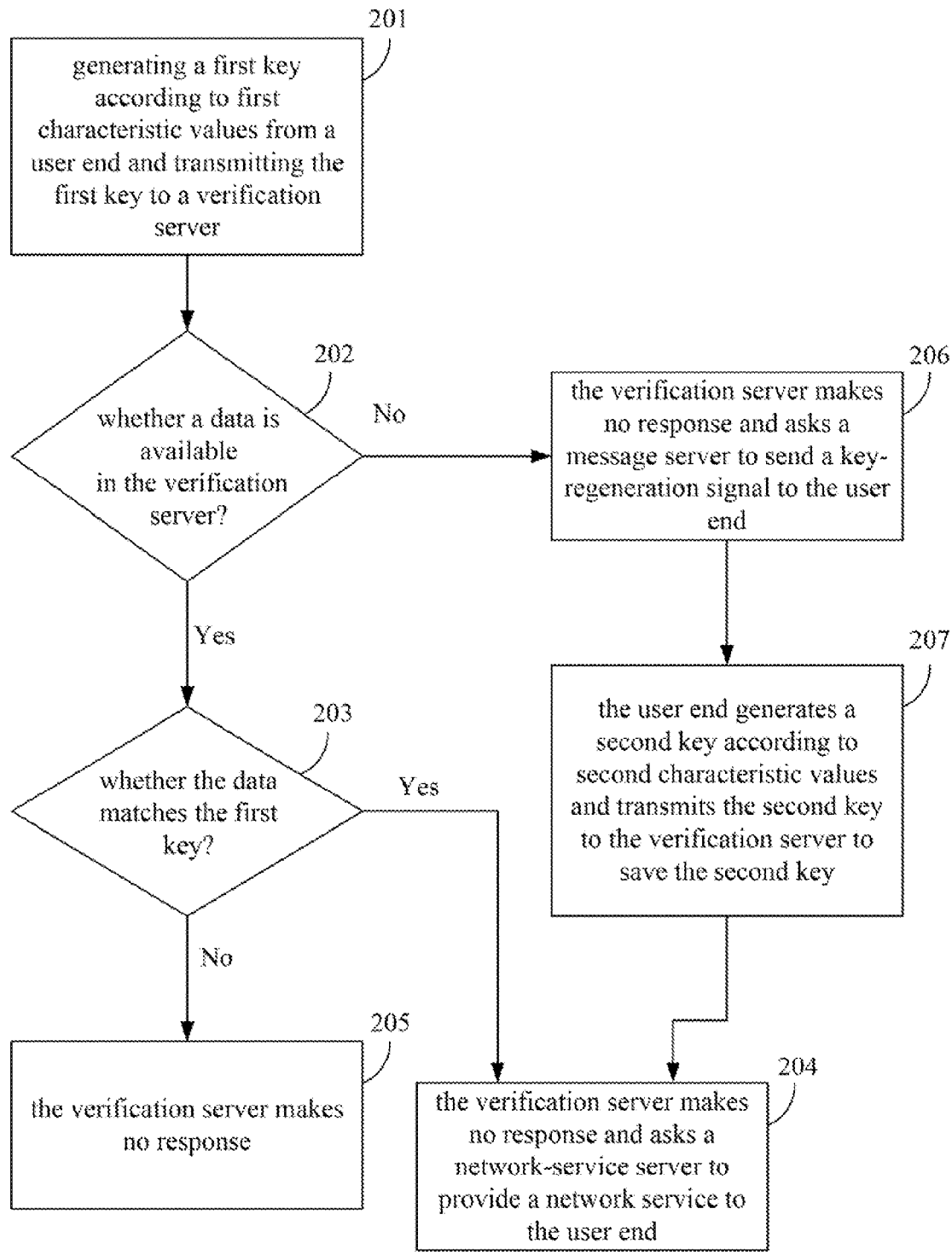
FIG. 2 is a flow chart of the tolerant key verification method of an embodiment of the present disclosure.

Please refer to FIG. 2. FIG. 2 is a flow chart of the tolerant key verification method of an embodiment of the present disclosure. The tolerant key verification method can be adapted to the network system 1 depicted in FIG. 1. The tolerant key verification method comprises the steps as follows. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed.)

In step 201, a first key 11 is generated instantly according to a plurality of first characteristic values from a user terminal 10 and the first key 11 is transmitted to the verification server 12.

In an embodiment, the first characteristic values comprise a user account and a first random number. The user account is the account provided to the user by the service provider. The first random number is generated by a random number generator (not shown) of the user terminal 10. The user account and the first random number remain the same if no abnormal condition occurs and are stored in a storage (not shown) in the user terminal 10, such as a hard disk or a USB storage. When the user starts to perform the verification procedure, the user account and the first random number are retrieved in order to generate the first key 11.

The first characteristic values further comprise at least one external characteristic value. The external characteristic value can be any information related to the time that the first key 11 is generated but unrelated to the user terminal 10, such as date information, time information, geographical information, country information, network-related information or weather information related to the time that the first key is generated. For instance, if the external characteristic value is the date information of the time that the first key 11 is generated, e.g. Apr. 6, 2010, the number of the date can be extracted so that the first key 11 can be generated according to the number of the date. The time information is the time that the first key 11 is generated, e.g. 15:37:33. The geographical and the country information can be extracted from the network information of the user terminal 10 such as the IP address, the router address or the ISP (Internet service provider) information of the user. The weather information is dependent to the weather condition so that the user can input the number corresponding to the type of the weather in real time when the first key 11 is generated.

In another embodiment, the first characteristic values further comprise at least one internal characteristic value. The internal characteristic value can be any information related to the time that the first key 11 is generated and related to the user terminal 10 as well, such as a media access control (MAC) address, a storage serial number, a computer identification number or a storage directory information of the user terminal 10. For example, the MAC address is the information on the network card of the user terminal 10. The storage serial number is the serial number of the storage that stores the user account and the random number. The computer identification number is the serial number or the name of the host of the user terminal 10. The storage directory information is the directory in the storage that stores the user account and the random number in the user terminal 10.

Consequently, the first key 11 can be generated according to different combinations of the information described above. For example, the first key 11 can be generated according to the combination of the user account, the date information and the time information, or can be generated according to the combination of the first random number, the MAC address and the storage directory information of the user terminal 10. Further, the first key 11 can be generated according to the combination of the weather and the storage serial number. Thus, the generation of the first key 11 shows many possibilities to reinforce the reliability of the key.

After the receipt of the first key 11, the verification service 12 performs a comparison between the first key 11 and a data stored in the verification service 12. The verification service 12 first checks whether the data is available in the verification service 12 for comparison in step 202. When the data is available, whether the first key 11 matches the data stored in the verification service 12 is determined in step 203.

When the data in the verification server 12 matches the first key 11, the verification server 12 makes no response and asks a network-service server 14 to provide a network service 13 to the user terminal 10 in step 204.

When the data in the verification server 12 does not match the first key 11, the verification server 12 makes no response in step 205.

When the data is not available in step 202, the verification server 12 makes no response and asks a message server 16 to send a key-regeneration signal 15 to the user terminal 10 in step 206. Upon receiving the key-regeneration signal 15, the user terminal 10 generates a second key 17 instantly according to a plurality of second characteristic values and transmits the second key 17 to the verification server 12 so that the verification server 12 saves the second key 17.

In an embodiment, the second characteristic values can comprise a user account, a second random number, at least one external characteristic value or at least one internal characteristic value just like the first characteristic values. It's noticed that the second random number is generated by the random number generator after the receipt of the key-regeneration signal 15 and is different from the value of the first random number. Thus, the second key 17 can be different from the first key 11 at least according to the second random number. Further, due to the difference of the external characteristic value and/or the internal characteristic value in the first key 11 and the second key 17, the content of the second key 17 can be much more different than that of the first key 11.

After the verification server 12 saves the second key 17, the verification server 12 makes no response and asks a network-service server 14 to provide a network service 13 to the user terminal 10 in step 204.

In an embodiment, the transmission of the first key 11, the receipt of the key-regeneration signal 15, the regeneration of the second key 17 and the transmission of the second key 17 are performed in the host of the user terminal 10 automatically. Thus, the user needs not to be involved with the process.

It's noticed that the verification server 12 only receives keys from the user terminal 10 without making any response and asks the message server 16 or the network-service server 14 to make response instead. Therefore, the hacker is not able to steal any information from the verification server 12 since the verification server 12 does not make any direct response to the user terminal 10. The reliability of the verification server 12 thus increases.

In another embodiment, the message server 16 and the verification server can be the same server, while the network-service server 14 is independent of the verification server 12.

However, the illegal user may steal the information from the user terminal 10 when it is not possible to steal the information from the verification server 12. If the illegal user simply copies the information in the user terminal 10, the key generated from the copied file will not be the same with the real key since the time of the generation of the file and the hardware information are all different from the real user terminal 10. Therefore, the illegal user won't pass the verification after performing the steps 201, 202, 203 and 205 in FIG. 2. The verification server 12 makes no response as well.

If the first characteristic values and the random number are all completely duplicated by the illegal user, then the illegal user is able to pass the verification process by following the steps 201 to 204. However, the service provider can exclude the illegal user by using other methods.

In an embodiment, the verification server 12 can detect if there is any abnormal condition of the user terminal to decide if a deletion of the data stored in the verification server 12 that is corresponding to the user is needed. For example, if the illegal user copies the first key and sells the first key to many people, the verification server 12 may detect the abnormal situation that many people from different places using the same key to pass the verification procedure through steps 201 to 204. The verification server 12 determines that the user information is stolen by illegal users and performs the deletion. After the deletion of the data, the first "user" logs in to the verification server 12, no matter illegal or not, is asked to regenerate the second key that is different from the first key since the data is deleted and is not available in the verification server 12. The verification server 12 further saves the second key so that only the first user logins after the deletion of the data is able to pass the verification procedure by using the second key, wherein the second key becomes the "first key" when the user logins next time. If the "first user" described above is not the legal user who originally owns the key, the legal user will be denied by the verification server 12 due to the new first key as well. When the legal user finds out that the verification procedure fails and informs the service provider, the service provider can delete the data in the verification server 12 again. Therefore, the legal user can login again and generate another second key since the data is not available in the verification server 12. After the verification server 12 saves the new second key generated from the legal user, only the legal user is able to pass the verification procedure. The illegal user can not login due to the data in the verification server 12 generated according to the new second key.

In another embodiment, the verification server 12 deletes the data corresponding to the user terminal 10 that is stored in the verification server 12 every fixed time interval. The fixed time interval can be, but not limited to, three weeks, three months or half a year in different embodiments. If the key is not stolen, the legal user can still login after the deletion of the verification server 12 to make the second key generate. If the key is stolen, the illegal user can still be denied through the procedure described above.

The number of the external and internal characteristic values described above can vary according to different applications. Consequently, there are many possible combinations of the characteristic values. In an embodiment, the is key can be generated according to different combinations of the characteristic values every time the key is generated.

The service provider can further make the users in specific area receive specific services through the use of the geometrical information or country information, make the users receive the service during specific time according to the time information or make the users receive the service according to a specific condition related to other possible information. Thus, the service provider can have manage the service of the users in an efficient way.

The tolerant key verification method allows the illegal user uses the service in a short time period when the verification data is lost, wherein the service provider does not suffer a lot from the loss of the verification data. The service provider can delete the data immediately when an abnormal condition occurs to further make the legal user generate the new key. Therefore, the low cost and low complexity of the verification method is accomplished. Furthermore, the time period that the illegal users use the service can be viewed as a trial period of the service. If the illegal user is denied by the verification mechanism described above and considers it worth to pay money for the service, the illegal user may pay for the service and become the customer of the service provider.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A tolerant key verification method, comprising the steps of:
   generating a first key instantly according to a plurality of first characteristic values from a user terminal;
   transmitting the first key to a verification server;
   comparing the first key with a data stored in the verification server;
   when the data in the verification server matches the first key, the verification server makes no response to the user terminal and requests a network-service server to provide a network service to the user terminal;
   when the data doesn't match the first key, the verification server makes no response to the user terminal; and
   when the data is not available, the verification server makes no response to the user terminal and requests a message server to send a key-regeneration signal to the user terminal such that the user terminal generates a second key instantly according to a plurality of second characteristic values and transmits the second key to the verification server so that the verification server saves the second key and requests the network-service server to provide the network service to the user terminal, wherein the message server and the verification server are whether the same server or two different servers.

2. The tolerant key verification method of claim 1, wherein the plurality of the first and the second characteristic values comprise an external characteristic value.

3. The tolerant key verification method of claim 2, wherein the external characteristic value is date information, time information, geographical information, country information, network-related information or weather information related to the time that the first and the second keys are generated.

4. The tolerant key verification method of claim 1, wherein the first and the second characteristic values comprise an internal characteristic value.

5. The tolerant key verification method of claim 4, wherein the internal characteristic value is a media access control (MAC) address, a storage serial number, a computer identification number or a storage directory information of the user terminal.

6. The tolerant key verification method of claim 1, wherein the first and the second characteristic values comprise a user account.

7. The tolerant key verification method of claim 1, wherein the first characteristic values comprise a first random number and the second characteristic values comprise a second random number.

8. The tolerant key verification method of claim 7, wherein the first random number and the second random number are generated by a random number generator.

9. The tolerant key verification method of claim 8, wherein the random number generator maintains the first random number at the same value after the generation of the first key and the random number generator makes the second random number different from the first random number when the random number generator generates the second key.

10. The tolerant key verification method of claim 1, wherein the network service is a network TV service, a network radio station service, an e-book database or an internet database.

11. The tolerant key verification method of claim 1, wherein when the verification server detects an abnormal condition of the user terminal, the verification server deletes the data corresponding to the user terminal that is stored in the verification server.

12. The tolerant key verification method of claim 1, wherein the verification server deletes the data corresponding to the user terminal that is stored in the verification server every fixed time interval.

* * * * *